US005565265A

United States Patent [19]

Rubin et al.

[11] Patent Number: 5,565,265

[45] Date of Patent: Oct. 15, 1996

[54] TREATED POLYESTER FABRIC

[75] Inventors: Craig A. Rubin; Randy B. Rubin, both of 32704 Ravine Dr., Franklin, Mich. 48025; Kyle Bullock, Forest City, N.C.

[73] Assignees: Craig A. Rubin; Randy B. Rubin, both of Franklin, Mich.

[21] Appl. No.: 215,305

[22] Filed: Mar. 21, 1994

[51] Int. Cl.[6] .......... B32B 7/00

[52] U.S. Cl. .......... 428/265; 8/495; 156/230; 427/261; 427/288; 427/389.9; 428/267; 428/907

[58] Field of Search .......... 8/495; 156/230; 427/261, 288, 389.9; 428/265, 267, 907

[56] References Cited

U.S. PATENT DOCUMENTS

| | | | |
|---|---|---|---|
| 3,023,072 | 2/1962 | Dabrowski . | |
| 3,111,361 | 11/1963 | Fang . | |
| 3,521,993 | 7/1970 | Swidler . | |
| 3,652,198 | 3/1972 | Farber . | |
| 3,713,878 | 1/1973 | Thomas | 117/135.5 |
| 3,922,399 | 11/1975 | Ochsner . | |
| 4,113,432 | 9/1978 | Otto . | |
| 4,189,429 | 2/1980 | Lambert, Jr. . | |
| 4,256,459 | 3/1981 | Russell et al. | 8/478 X |
| 4,365,968 | 12/1982 | Gregorian et al. . | |
| 4,496,363 | 1/1985 | DeFilippi . | |
| 4,518,649 | 5/1985 | Wang et al. | 428/284 |
| 4,721,511 | 1/1988 | Kupits | 8/188 |
| 4,775,384 | 10/1988 | Bachem et al. . | |
| 4,795,675 | 1/1989 | Dunn, Jr. et al. | 428/260 |
| 4,835,019 | 5/1989 | White et al. . | |
| 4,844,952 | 7/1989 | Korenkiewicz et al. . | |
| 4,861,501 | 8/1989 | Pfeifer . | |
| 4,901,389 | 2/1990 | Poulenard et al. . | |
| 5,009,667 | 4/1991 | Beck et al. . | |
| 5,126,138 | 6/1992 | McGee et al. | 424/404 |
| 5,194,667 | 3/1993 | Oxenrider et al. . | |
| 5,196,080 | 3/1993 | Mizobuchi et al. . | |

*Primary Examiner*—Michael Lusignan
*Attorney, Agent, or Firm*—Brooks & Kushman P.C.

[57] ABSTRACT

A liquid and stain resistant, antimicrobial fabric is provided that can withstand the high temperatures required for transfer printing. A coating composition comprising a copolymer composition, an antimicrobial agent and a fluorochemical composition is applied to fabric such as polyester, to produce the coated fabric. The liquid and stain resistant antimicrobial, printed fabric retains its natural texture, is durable and easy to handle.

16 Claims, No Drawings

TREATED POLYESTER FABRIC

FIELD OF THE INVENTION

The present invention relates to treated polyester fabric and more particularly, to a method of preparing a liquid and stain resistant, antimicrobial fabric that may be printed by transfer printing.

BACKGROUND OF THE INVENTION

Fabrics including man-made fabrics such as polyester, are generally made liquid resistant by various processes. For example, textile fabrics are first treated with a soap solution and then treated with a solution of zinc soap which may include zinc and calcium sterates and sodium soaps. It is also possible to render fabric liquid resistant by treating the fabric with commercially available silicone steroids. Textile fabrics have also been made liquid resistant by coating the fabric with a polymeric material, for example, vinyl, urethane and various latex coatings.

Although treating or coating fabric renders the fabric liquid resistant, it is known that these treated or coated fabrics can not be satisfactorily printed. The treated liquid resistant fabrics refuse to accept or become incompatible with the application of color dyes. The polymeric coated liquid resistant fabrics can not be printed because heat is required in the printing process and these ,coated fabrics have a very low melting temperature.

It would thus be desirable to provide a liquid resistant fabric that may be printed. It would also be desirable to provide a liquid and stain resistant, antimicrobial fabric that may be printed. It would further be desirable to provide a fabric that allows vapor barriers to pass through the fabric while prohibiting the passage of liquid. It would also be desirable to provide a method of producing a liquid and stain resistant antimicrobial fabric that is subsequently printed. It would further be desirable to provide a printed, liquid and stain resistant, antimicrobial fabric that retains its natural texture, is easy to handle and economical to produce.

SUMMARY OF THE INVENTION

A liquid and stain resistant, antimicrobial fabric is provided that is durable enough to withstand the high temperatures required for transfer printing. The fabric of the present invention is covered with a coating composition comprising a copolymer composition, an antimicrobial agent and fluorochemicals. Once the fabric is thoroughly covered with the coating composition, the fabric is printed by transfer printing, a process well known in the art. The coated fabric can surprisingly withstand the high temperatures of the transfer printing process, thus producing a liquid and stain resistant, antimicrobial, printed fabric.

The liquid and stain resistant, antimicrobial, printed fabric of the present invention retains its natural "hand" or texture and is therefore aesthetically attractive (e.g. it does not look or feel like plastic). The fabric of the present invention is also durable, easy to handle and economical to produce.

The present invention also provides a method of providing the liquid and stain resistant, antimicrobial, printed fabric. A coating composition comprising a copolymer composition, an antimicrobial agent and fluorochemicals is applied to fabric such as polyester and then heated until the coating composition is completely dry. The coating step may be repeated to completely coat the fabric. The coated fabric is then printed by transfer printing.

Additional objects, advantages, and features of the present invention will become apparent from the following description and appended claims.

DETAILED DESCRIPTION OF THE PREFERRED EMBODIMENTS

A liquid and stain resistant, antimicrobial fabric is provided that may be printed by transfer printing. The fabric of the present invention retains the texture of untreated fabric and is therefore aesthetically attractive (e.g. it does not look or feel like plastic). The fabric of the present invention is also durable, easy to handle and economical to produce. Furthermore, the fabric of the present invention has passed various flame retardant codes for the upholstery industry.

In the method of the present invention, fabric such as polyester is treated with a coating composition comprising a copolymer composition, an antimicrobial agent and a fluorochemical composition. Various fabrics may be treated by the method of the present invention, including polyester, and nylon, wherein polyester is the preferred fabric. The coating composition of the present invention may be applied by various methods known in the art, such as by spraying or dipping. In a preferred method, the fabric is dipped to ensure complete coverage of the fabric. The fabric may also be sprayed or dipped numerous times to completely cover the fabric. The coated fabric may then be printed by transfer printing, a method known to those skilled in the art and described below.

The coating composition of the present invention comprises a copolymer composition, an antimicrobial agent and a fluorochemical composition. The copolymer composition comprises about 85% to about 90% by weight of the coating composition. The copolymer composition may comprise acrylic copolymer such as butyl acrylate and ethyl acrylate copolymer, and styrene acrylate copolymer is preferred.

The antimicrobial agent comprises about 0.25% to about 1% by weight of the coating composition. By "antimicrobial agent" is meant any substance or combination of substances that kills or prevents the growth of a microorganism, and includes antibiotics, antifungal, antiviral and antialgal agents. The preferred antimicrobial agent is ULTRA FRESH™, available from Thomas Research, and INTERSEPT™, available from Interface Research Corporation, may also be employed.

The fluorochemical compostion comprises about 6% to about 12% by weight of the coating compositions preferably 10%. The fluorochemicals provide water and stain resistance and may comprise unbranded generic fluoropolymers. Commercially available fluorochemical compositions such as SCOTCHGUARD™ FC 255, SCOTCHGUARD™ FC 214–230, available from 3M, and TEFLON™ RN, TEFLON™ 8070, TEFLON™ 8787, available from Dupont, are preferred. TEFLON™ 8070 is the most preferred fluorochemical.

The coating composition may also include other additives such as thickeners, which may be used to obtain the desired consistency and coating properties. Preferred thickeners include polyacrylate and hydroxymethyl cellulose. Other additives such as natural gums, associative thickeners and surfactants may also be employed. In addition, UV stabilizers may be added.

It will be appreciated by those skilled in the art that the amount of the copolymer composition, antimicrobial agent, fluorochemicals and additives may be varied depending on the desired result of the coating composition. It will also be appreciated that the combination of the various components of the composition of the present invention may be varied to achieve the desired result.

As mentioned above, the fabric of the present invention is durable, easy to handle and economical to produce. Because the fabric retains its "hand" or texture, the fabric is easy to sew and seams are less noticeable, and more durable. For example, when vinyl is sewed, the needle holes tend to open when the vinyl is stretched. With the fabric: of the present invention, needle holes do not tend to open and thus the seams are stronger and less noticeable. The fabric of the present invention also has flame retardant characteristics, as described in greater detail below. Moreover, while the fabric provides a moisture barrier, it is believed that vapors are allowed to pass through the fabric. Human skin which may come in contact with the fabric, for example in upholstery applications, is therefore less likely to perspire.

The following Specific Example further describes the present invention.

SPECIFIC EXAMPLE 1

The coating compositions of the present invention comprise a copolymer composition, an antimicrobial agent and a fluorochemical composition. The coating compositions may also comprise additives such as thickeners and surfactants. A preferred coating composition of the present invention is:

| Formula A | |
|---|---|
| Acrylic Polymer | 5–10% (10% preferred) |
| Fluorochemical | 4–8% (8% preferred) |
| Biocide/Mildewcide | .25–1% (1% preferred) |
| Water | remainder to 100% |

wherein the % is by weight. Another preferred coating composition is::

| Formula B | |
|---|---|
| Acrylic Latex Polymer | 90–95% (90% preferred) |
| Fluorochemical | 4–6% (6% preferred) |
| Biocide/Mildewcide | .25–1% (1% preferred) |
| Thickener | 1–3% (3% preferred) |

wherein the % is by weight.

SPECIFIC EXAMPLE 2

The following is a description of the preferred method of the present invention.

Polyester fabric is ordered from a mill, wherein the fabric has been heat set and scoured to remove any residue used in weaving. The fabric is placed on A-Frames and then placed into a tenterframe. The tenterframe holds the fabric with constant tension so that the fabric will not shrink during finishing. The coated fabric of the present invention is then produced in three applications. In pass number one, the fabric is coated with a mixture of acrylic latex polymers, fluorochemicals, and antibacterial, biocide and mildewcide chemicals as described in Specific Example 1, Formula A. The fabric is coated with all of these ingredients in liquid form. On this first pass, the fabric is completely wet. It then passes through an oven at approximately 300° F. to about 350° F. for about 1 min to about 8 min, preferrably for about 2 min. In the second pass, the fabric remains on the tenterframe and is coated with a fine layer of acrylic latex polymers, fluorochemicals as well as biocide and mildewcide, as described in Specific Example 1, Formula B. In a highly preferred embodiment, the fluorochemical component of Formula B is removed and the amount of the acrylic latex component is increased. This compound is applied at a constant thickness of about 1 mm with a blade. This compound contains an increased amount of latex and has the consistency of wall paste. The purpose of this coating is to fill in the spaces between yarns. The coated fabric is then passed through an oven a second time at 300° F. to about 350° F. Pass number three is identical to pass number two and the purpose of the third pass is to insure that there are no openings in the fabric and that there is complete coverage of the fabric. Again, in a highly preferred embodiment, the coating composition used during pass number 3 does not contain the fluorochemical composition. The coated fabric is now prepared for printing.

After the fabric has been suitably coated, the fabric is caused to be printed by transfer printing. Transfer printing is generally known in the art and generally, color designs mounted on paper carriers are transferred to the coated fabric. The color designs may be transferred from the paper carriers to the coated fabric by pressure-heat contact methods or by heat-vaporization methods. For example, color-prints on a paper carrier are made to come in continuous contact with the treated fabric, and while in contact, pressure is applied such as by a pair of rollers disposed to produce a collandering effect. The pressure is about 50 lbs to about 60 lbs, with 60 lbs preferred. Heat is also applied at about 380° F. to about 430° F., preferrably at 420° F. The dwell time, or time where heat and/or pressure are applied, is a time sufficient for the prints to be transferred to the fabric, preferably about 15 sec to about 30 sec. The heat and pressure permit the transfer of the color design from the paper carrier to the fabric. Transfer of the prints from the paper carrier can also be effected by the use of heat-vaporization methods, known to those skilled in the art. It will of course be appreciated by those skilled in the art that the coated fabric of the present invention may have color prints stamped thereon in any number of ways, and there is no limitation on the number of colors, the variations and graduation of color, and number of different configurations of prints that can be applied. Moreover, there are any number of ways such prints can be transferred to the coated fabrics and the above are merely representative methods.

SPECIFIC EXAMPLE 3

The treated fabric of the present invention was tested for flammability, resistance to staining, resistance to yarn slippage at seams, tensile strength and tear strength. The following is a summary of the tests and testing results.

Flammability. The treated fabric was tested in accordance with Federal Laws cited in the State of California Home Furnishings Act, Bulletin 117 Section E, using apparatus and methods outlined in Title 16 C.F.R. Section 1610 "Standard for the Flammability of Clothing Textiles," herein incorporated by reference. The test criteria include 1) if an ignition of the substrate in any of three test specimens occurs, the fabric is a UFAC Class 2 fabric; 2) if the vertical char of any of three test specimens is equal to or greater than 4.5 cm (1.75 in.), the fabric is a UFAC Class 2 fabric; and 3) if an individual specimen yields a char of 4.5 cm (1.75 in.) or greater, the fabric is a UFAC Class 1 fabric. None of three specimens of the treated fabric of the present invention ignited. Thus, the treated fabric was rated as a Class 1 material (normal flammability), classified in accordance with the Federal Flammable Fabrics Act. The treated fabric of the present invention, therefore, met the standards set forth in the State of California Home Furnishings Act, Bulletin 117 Section E.

Resistance to Staining. The treated fabric was tested under the BFTB 402 Standard test conditions for resistance to staining. The following rating system was used:

Class 4: Complete removal

Class 3: Good removal, traces of stain removal

Class 2: Fair removal, more than 50% stain removed

Class 1: Poor removal, less than 50% stain removed

The following table summerizes the test results:

| | RATING FOR AMOUNT OF REMOVAL | | | |
|---|---|---|---|---|
| | WATER BASE REMOVAL | | SOLVENT BASE REMOVAL | |
| Type of Stain | After 5 min Ageing | After 24 hr Ageing | After 5 min Ageing | After 24 hr Ageing |
| Blood | Class 4.0 | Class 4.0 | Class 4.0 | Class 4.0 |
| Urine | Class 4.0 | Class 4.0 | Class 4.0 | Class 4.0 |
| Betadine | Class 4.0 | Class 4.0 | Class 3.0 | Class 2.0 |

Resistance to Yam Slippage at Seams. The treated fabric was tested under the ASATM D 4034 standard test conditions for resistance to yarn slippage at seams. The ASTM D 3597 specification for woven upholstery fabrics (plain, tufted or flocked) requires a 25 lb minimum. In the preliminary test, the wrap seam thread break was at 95 lbs and the filling seam thread break was at 87 lbs. In the remaining four samples, the average seam thread break, caused by thread break, was 92 lbs.

Tensile Strength. The treated fabric was tested under the ASTM D 5034 standard test conditions for tensile strength (grab). The ASTM D 3597 specification for woven upholstery fabric requires a 50 lb minimum. Five samples were tested and the average wrap was 284.8 lbs and the average filling was 196.4 lbs.

Tear Strength. The treated fabric was tested under the ASTM D 2261 standard test conditions for tear strength (tongue). The ASTM D 3597 specification for woven upholstery fabrics (plain, tufted or flocked) requires a 6 lb minimum. Five samples were tested and the average across wrap was 15.4 lbs and the average across filling was 15.4 lbs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the specification and following claims.

We claim:

1. A method of producing a liquid and stain resistant, antimicrobial, printed fabric comprising the steps of: a) coating the fabric with a composition comprising effective film-forming amounts of:

i. a nonfluorinated copolymer composition;

ii. an antimicrobial agent; and iii. a fluorochemical composition;

b) heating the coating fabric to dry the coating; and c) transfer printing the coated fabric.

2. The method of claim 1, wherein the fabric is polyester,.

3. The method of claim 1, wherein the copolymer composition comprises about 85% to about 90% by weight of the coating composition.

4. The method of claim 1, wherein the antimicrobial agent comprises about 0.25% to about 1% by weight of the coating composition.

5. The method of claim 1, wherein the fluorochemical composition comprises about 4% to about 8% by weight of the coating composition.

6. The method of claim 1, wherein the coated fabric is heated at a temperature of about 300° F. to about 350° F. for about 1 min to about 8 min.

7. The method of claim 1, wherein the step of transfer printing comprises:

a) applying color prints to a paper carrier;

b) causing the paper carrier to contact the coated fabric; and c) applying heat and pressure to the prints to cause them to be transferred to the coated fabric.

8. The method of claim 7, wherein the pressure of step c)is about 50 lbs to about 60 lbs for about 15 sec to about 30 sec.

9. The method of claim 7, wherein the temperature of the heat is about 380° F. to about 430° F.

10. The method of claim 7, wherein the prints are caused to be transferred by applying heat vaporizing to the prints.

11. A liquid and stain resistant, antimicrobial fabric, capable of being printed by transfer printing, wherein the fabric is produced by coating the fabric with a composition comprising effective film forming amounts of:

a) a nonfluorinated copolymer composition;

b) an antimicrobial agent; and c) a fluorochemical composition;

and heating the coated fabric to dry the coating.

12. The fabric of claim 11, wherein the fabric is polyester.

13. The fabric of claim 11, wherein the copolymer composition comprises about 85% to about 90% by weight of the coating composition.

14. The fabric of claim 11, wherein the antimicrobial agent comprises about 0.25% to about 1% by weight of the coating composition.

15. The fabric of claim 11, wherein the fluorochemical composition comprises about 4% to about 8% by weight of the coating composition.

16. The fabric of claim 11, wherein the coated fabric is heated at a temperature of about 300° F. to about 350° F. for about 1 min to about 8 min.

* * * * *